(12) United States Patent
Kornberg et al.

(10) Patent No.: US 7,585,912 B2
(45) Date of Patent: Sep. 8, 2009

(54) FLAME-RETARDANT POLYSTYRENES

(75) Inventors: Nurit Kornberg, Lehavim (IL); Jakob Oren, Nesher (IL); Smadar Hini, Meiter (IL); Michael Peled, Sheva (IL)

(73) Assignee: Bromine Compounds Ltd., Beer Sheva (IL)

( * ) Notice: Subject to any disclaimer, the term of this patent is extended or adjusted under 35 U.S.C. 154(b) by 231 days.

(21) Appl. No.: 11/632,891

(22) PCT Filed: Jul. 19, 2005

(86) PCT No.: PCT/IL2005/000767

§ 371 (c)(1),
(2), (4) Date: Mar. 7, 2007

(87) PCT Pub. No.: WO2006/013554

PCT Pub. Date: Feb. 9, 2006

(65) Prior Publication Data

US 2007/0257241 A1    Nov. 8, 2007

(30) Foreign Application Priority Data

Jul. 19, 2004    (IL)    ................................... 163100

(51) Int. Cl.
C08K 5/03 (2006.01)
C09K 21/08 (2006.01)
C07C 25/02 (2006.01)

(52) U.S. Cl. .................. 524/469; 524/470; 524/577; 523/351; 521/146; 252/609

(58) Field of Classification Search ............... 524/469, 524/470, 577; 523/351; 521/146; 252/609
See application file for complete search history.

(56) References Cited

U.S. PATENT DOCUMENTS

| | | | | |
|---|---|---|---|---|
| 2,676,927 | A | * | 4/1954 | McCurdy et al. ............ 521/146 |
| 3,635,850 | A | * | 1/1972 | Birkner et al. ............... 521/146 |
| 3,787,506 | A | | 1/1974 | Ungefug et al. |
| 3,817,912 | A | | 6/1974 | Diebel et al. |
| 3,920,606 | A | | 11/1975 | Diebel et al. |
| 4,211,730 | A | * | 7/1980 | Vollkommer et al. .... 526/219.6 |
| 5,204,394 | A | | 4/1993 | Gosens et al. |
| 5,639,799 | A | | 6/1997 | Books et al. |
| 5,717,001 | A | | 2/1998 | Books et al. |
| RE36,188 | E | | 4/1999 | Gosens et al. |
| 6,028,156 | A | | 2/2000 | Peled et al. |
| 6,579,911 | B1 | | 6/2003 | Vo et al. |

FOREIGN PATENT DOCUMENTS

| | | |
|---|---|---|
| EP | 1 327 635 | 8/2005 |
| GB | 1 107 283 | 3/1968 |
| WO | WO 91/19758 | 12/1991 |

OTHER PUBLICATIONS

Encyclopedia of Polymer Science and Engineering, John Wiley & Sons publishers 1989, vol. 16, pp. 193-205.

* cited by examiner

*Primary Examiner*—Fred M Teskin
(74) *Attorney, Agent, or Firm*—Roach Brown McCarthy & Gruber, P.C.; Kevin D. McCarthy

(57) ABSTRACT

The present invention relates to a styrenic polymer composition comprising a flame-retardant effective amount of a compound of formula (I): $(C_6H_{(5-n)}Y_n)CH_2X$, wherein X is Cl or Br; Y is Cl or Br; and n is an integer between 1 and 5; or a mixture of two or more of said compounds of formula (I) or their homologues and derivatives or other Br-FRs.

43 Claims, No Drawings

FLAME-RETARDANT POLYSTYRENES

FIELD OF THE INVENTION

This invention relates to the flame-proofing, increasing fire resistance of polystyrene and styrene containing alkenyl aromatic polymers and their foams.

BACKGROUND

Molding compositions based on polystyrene are used to an increasing extent in many fields of applications, predominantly in the construction, packaging, electrical and automotive industries. In particular, foamed polystyrene found a major role in construction and packaging applications because of their favorable mechanical and physical properties, such as insulation against heat, sound and electricity. The major limitation of molded or foamed polystyrene based articles is their combustibility.

Polymer foams have become available in a wide variety of forms, especially foam sheets, films, profiles and slabs for uses such as packaging, pipe and tubing, garment trimmings, construction and insulation. Foamed polystyrene is currently used in the insulation of freezers, coolers, trucks, railroad cars, buildings, roof decks and housing. Polystyrene foams are also used as the core material for structural multilayered panels. There is an increasing demand, partially driven by legislation, to improve the fire retardant properties of polymers in such applications.

The use of halogenated organic compounds as additives to polystyrene products is a well-known practice. In order to render the products fire resistant, brominated organic compounds have been used in both foamed and non-foamed polystyrene compositions. Of the various brominated organic flame retardant agents commercially available mainly brominated aliphatic compounds are utilized with vinyl-aromatic polymer foams. Hexabromocyclododecane, HBCD, and 1,2-dibromomethyl-4-(1,2-dibromomethyl)cyclohexane, BCL-462, Albemarle, are the most common flame retardants used in foamed polystyrene articles.

Dow patent, WO 91/19758, describes the limited fire retardancy of HBCD and discloses the use of a mixture of aliphatic bromine compounds, especially HBCD, and aromatic bromine compounds such as decabromodiphenylether as flame retardant for PS foams as a method to improve the flame retardancy known in the prior art. Another Dow patent, U.S. Pat. No. 6,579,911, discloses an application of HBCD and phosphate or phosphorous compounds and flow promoter, to improve the flame retardance efficiency known in the prior art. The patent also emphasizes that, typically, only brominated aliphatic compounds are utilized with vinyl-aromatic based foams, with HBCD being the most common.

U.S. Pat. No. 5,639,799 and U.S. Pat. No. 5,717,001 disclose methods to improve the thermal stability of HBCD for application in styrenic polymer foam compositions.

The amounts of flame retardant additives and synergists incorporated in polystyrene compositions used in foams must be strictly controlled, since they can negatively affect the structural qualities and skin quality of the foam and reduce the strength of the foam or its insulating properties at high levels. In non-foamed polystyrenic compositions the typical loading of flame retardant additives is significantly higher than in foamed compositions. Therefore flame retardants for foamed polystyrene compositions must have a high degree of efficiency, or in other words, the suitable organic compounds must release, when subjected to fire, the appropriate amount of bromine at the suitable temperature in order to prevent the foamed polystyrene resin from combustion.

DE 2,064,677A discloses a low inflammability molding composition of a styrene polymer that can be obtained, if the styrene polymer contains brominated polyalkylbenzenes. The brominated polyalkylbenzenes disclosed therein contain substituents on the aromatic ring of bromomethyl, and dibromomethyl in numbers varying between 2 and 4, and alkyl of 1 to 4 carbon atoms, bromine, and chlorine in numbers between 1 and 4. However, DE 2,064,677 does not mention a use of a brominated alkylbenzene having a single bromomethyl group on its ring.

Other properties that should be fulfilled by a brominated organic compound, specially designed for flame retarding foamed polystyrene articles, are:

1. Suitable thermal stability of the brominated organic flame retardant is another crucial property, since additives of low thermal stability will limit the possibilities for processing, regrinding and recycling of flame retarded material. Flame retardant additives of insufficient thermal stability will cause degradation of the polystyrene resin, by reducing the molecular weight of the styrene polymer, during processing, and this in turn will immediately cause a drop in all mechanical and insulating properties of the foam, and even corrosion of the equipment in the most severe cases.
2. For most of the existing brominated organic flame retardants it is common practice to apply a specially stabilized material, mainly by using acid scavenger type additives.
3. Good chemical compatibility of the brominated organic compound with the polystyrene matrix is usually achieved by applying criteria of chemical structure resemblance or by solubility measurements.

Obviously one would expect a brominated aromatic compound to be the most suitable flame retardant additive for foamed polystyrene formulations, while the most common existing additives are aliphatic brominated structures.

Several types of additives are known to those experienced in the art as increasing the efficiency of brominated aliphatic flame retardants, so that the amount of bromine added to the polystyrene foam for fulfillment of flammability standards is reduced. Among these additives several types are inherently relevant to any brominated flame retardant designed for foamed polystyrene, and not limited to HBCD or aliphatic bromine compounds:

1. Flow promoters, melt flow modifiers, may be included in the polystyrene flame retardant formulation; in addition it is also known that they can increase the efficiency of the flame retardant compound. It is commonly accepted that such flow promoters are also capable of providing a source of reactive free radicals that are formed at temperatures lower than the formation of bromine radicals from the flame retardant additive. Such flow promoters are therefore also applied as part of the flame retarding system. The addition of such "free radical starters" enables, therefore, the use of lower levels of brominated flame retardant additive. WO 91/19758 and U.S. Pat. No. 6,579,911, incorporated here by reference, disclose the use of flow promoters together with HBCD. Typical flow modifiers include 2,3-dimethyl-2,3-diphenylbutane; bis(alpha-phenylethyl) sulfone; 1,1'-diphenylbicyclohexyl; 2,2'-dimethyl-2,2'-azobutane; 2,2'-dibromo-2,2'-azobutane; 2,2'-dichloro-2,2'-azobutane; 2,2'-dimethyl-2,2'-azobutane-3,3'4,4'-tetracarboxylic acid; 1,1'-diphenylbicyclopentyl; 2,5-bis(tribromomethyl)-1,3,4-thiadiazole; dioctyl tin maleate and dibutyl tin maleate.
2. Processing aids commonly applied together with flame retardants in foamed polystyrene are epoxy oligomers and most preferably brominated epoxy oligomers (BEO). BEO encompasses, inter alia, brominated oligomers containing epoxy groups, based on bisphenol A, such as TBBA. An illustrative example is the commercial product F-2200, supplied by the Dead Sea Bromine Group, Israel. These processing aids reduce the viscosity during foaming and enable the building of fine cells. Moreover BEO's act as heat stabilizers.

3. Phosphate and phosphorous compounds are known as flame retardants in some applications, including blends of styrenic resins. U.S. Pat. No. 5,204,394 relates to a polymer mixture which comprises an aromatic polycarbonate, a styrene-containing copolymer and/or a styrene-containing graft polymer and oligomeric phosphate flame-retardants, wherein the mixture has improved properties. As mentioned above, phosphate and phosphorous compounds are also incorporated together with halogenated flame-retardant compounds.

In other applications, synergism of phosphorous and bromine has been described. The use of phosphorous compounds together with HBCD was described in U.S. Pat. No. 6,579,911. The use of phosphorous compounds together with the brominated flame retardant results in another clear advantage, when processing the foamed polystyrene composition. The good solubility of the phosphate compound in the styrenic resin results in a lowering of the glass transition temperature of the polystyrene resin, and consequently the processing temperature can be lowered while the dispersion of the flame retardant in the resin is kept optimal and the density of the foam is kept low even at lowered processing temperature.

SUMMARY OF THE INVENTION

The present invention relates to the use of aromatic polyhalogenated halomethyl compounds of the general formula (I), which were found to be very efficient in flame retarding polystyrenes.

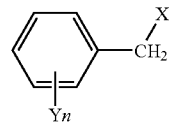

(I)

X = Cl, Br
Y = Cl, Br
n = 1-5

Among the formula (I) compounds, pentabromobenzyl bromide (PBB-Br) is particularly preferred.

U.S. Pat. No. 6,028,156 discloses the use of pentabromobenzyl bromide, PBB-Br, as a precursor in the polymerization of poly-pentabromobenzyl acrylate (PBB-PA). PBB-Br itself is not known as a commercial flame retardant in polystyrene. The ester derivatives of carboxylic acids or phosphonic acids of PBB-Br are known as flame retardants.

It is an object of the present invention to provide a thermally stable polystyrene composition that is suitable for producing flame-retarded polystyrene and styrene containing alkenyl aromatic polymers, having good mechanical properties, wherein the flame-retardant is an aromatic polyhalogenated halomethyl compound of formula (I).

It is another object of the invention to provide thermally stable polystyrene composition of the type described above, in which the flame-retardant active component comprises pentabromobenzyl bromide.

It is yet another object of the present invention to provide flame-retardant compositions comprising formula (I) compounds, particularly PBB-Br, and synergists.

It is yet another object of the present invention to provide flame-retardant compositions comprising formula (I) compounds, particularly PBB-Br, and other flame-retardant additives.

It is a further object of the invention to provide flame-retardant compositions of the type described above, in the form of concentrates and/or master batches.

Still another object of the present invention is to provide a method of rendering foamed polystyrene flame-retarded, which employs a composition comprising PBB-Br and optionally at least one synergist.

These and other objects and advantages of the invention will become apparent as the description proceeds.

In one aspect, therefore, the present invention provides a fire retardant polystyrene foam in which the flame retardant formulation comprises aromatic polyhalogenated halomethyl compounds of the general formula (I), such as pentabromobenzyl bromide otherwise known as benzene pentabromo-(bromomethyl), CAS [38521-51-6], FR-706 (supplied by Dead Sea Bromine Group, Israel), or a mixture of pentabromobenzyl bromide and a phosphorous compound, or a mixture of pentabromobenzyl bromide and a flow promoter or a mixture of Pentabromobenzyl bromide, a phosphorous compound and a flow promoter.

Other illustrative examples of formula (I) compounds include, e.g., 1,2,3,4-tetrabromo-5-bromomethyl-6-chloro-benzene, 1,2,4-tribromo-6-bromomethyl-3,5-dichloro-benzene, 1,2,3,4,5-pentabromo-6-chloromethyl-benzene, 1,2,4-tribromo-5-bromomethyl-benzene, as well as their homologues and derivatives. As will be appreciated by the skilled person the above examples are only provided by way of illustration, since many differently substituted compounds of formula (I) or mixture thereof can be used for the purpose of the invention, which is not meant to be limited to any particular compound.

The foam can be prepared by extrusion process or any other known technology. U.S. Pat. No. 6,579,911 and WO 91/19758, the full disclosures of which are incorporated herein by reference, describe mixtures of polystyrenes, phosphorous compounds and flow promoters, and different technologies of blowing agents, respectively.

According to a preferred embodiment the invention is directed to foamed polystyrene comprising an effective-amount of flame-retardant PBB-Br (Pentabromobenzyl-bromide).

According to another preferred embodiment of the invention the flame-retardant further comprise synergists, said synergists being selected from a phosphate or phosphorous compound, a flow-promoter or a composition thereof. Typically, but non limitatively, the phosphorous compound is present in an amount of from about 0.1% to about 10.0% by weight based on 100% of styrene, most preferably from about 0.5% to about 2.0% by weight based on 100% of styrene polymer. Illustrative examples of phosphorous compounds are 4,4'-biphenol bis(diphenyl phosphate) and TPP (triphenyl phosphate).

The phosphorous-containing additive of the present invention can be any organophosphorous compound. Organic phosphorous-containing compounds suitable for use according to the present invention include phosphates, phosphonates, phosphinates, phosphites and phosphine oxides. The phosphorous-containing additive may include monomeric, dimeric and/or oligomeric phosphorous compounds.

Organic phosphorous-containing additives particularly suitable for use together with PBB-Br include aromatic phosphate esters which can be represented by formula (II):

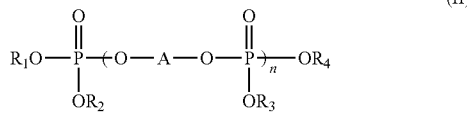

(II)

in which $R_1$, $R_2$, $R_3$ and $R_4$ are the same or different aryl groups; and wherein A is an arylene group; and n is an integer from 0 to 5. The phosphate esters can be either triarylphosphates, where "n" in the formula given above is 0, or monomeric bisphosphates, where "n" in the formula is 1, or mixtures of said triaryl phosphates and monomeric bisphosphates with higher oligomers, where "n" for each oligomer is an integer from 2 to 5 (said mixtures hereinafter indicated also as oligomeric phosphates).

The aryl group may be phenyl, cresyl, 2,6-xylenyl, and the like.

The arylene group may be a group derived from a dihydric compound, for example, resorcinol, bisphenol-A, 4,4'-biphenol, and the like.

Especially preferred arylphosphate esters for use herein include triphenyl phosphate (TPP) and oligomeric 4,4'-biphenol bis(diphenyl phosphate).

According to a preferred embodiment of the present invention said phosphorous containing component may consist of a single phosphorous-containing material or it may consist of a mixture of two or more different organic phosphorous-containing compounds as herein before mentioned that may be suitable for obtaining the desired properties of the polystyrene polymer.

The organic phosphorous-containing additive can be used either as a viscous liquid or more preferably as solid flakes (TPP) or free flowing powder (4,4'-biphenol bis(diphenyl phosphate)), or as a preliminary melt mixed in polystyrene polymer.

A sample of oligomeric 4,4'-biphenol bis(diphenyl phosphate) (formula (III)), abbreviated as PFR-221, with a monomeric bisphosphate content of more than 75%, having the following formula, was used in the examples to follow.

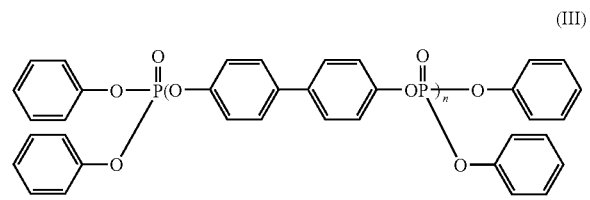

(III)

According to a preferred embodiment of the invention the flow promoter is selected from dimethyldiphenylbutane, dicumyl peroxide or alpha,alpha'-bis-tert-butylperoxydiisopropylbenzene, and diethyldiphenylbutane. Typically, the flow promoter is present in an amount of from about 0.01% to about 0.2% by weight based on 100% of styrene polymer, more preferably from about 0.02% to about 0.1% by weight based on 100% of styrene polymer. An illustrative example of a flow-promoter is dicumyl (2,3-dimethyl-2,3-diphenylbutane).

In one aspect, the invention is directed to the use of halobenzyl halides as flame retardants in foamed polystyrene.

The invention is also directed to the use of PBB-Br as a flame-retardant in foamed polystyrene.

In another aspect the invention is directed to a method of rendering foamed polystyrene flame-retarded comprising adding to polystyrene an effective amount of a formula (I) compound, preferably—but not limitatively—of PBB-Br.

DETAILED DESCRIPTION OF THE INVENTION

Process Background and Experimental Conditions

The process of manufacturing extruded styrenic polymer foam usually comprises the following steps: a) All of the constituents are blended in any conventional manner and in any desired order. For example the constituents can first be dry mixed and then fed to a twin screw extruder to obtain a blended material for feed to an injection molding apparatus. b) A more convenient way to add the flame retardant system to the styrenic polymer is a master batch, which is a concentrated, heat blended or extruded mixture of the various additives in the polymer. c) The master batch is then added to the bulk of the styrenic polymer material in proportions to give the desired level of additives in the final blended product. d) Styrenic foamed articles are formed by mixing the additives individually or by master batch with the polymer and then feeding the mixture to an extruder with a foaming agent and a nucleating agent.

The main stages of the preparation and evaluation of polystyrene foamed specimens are briefly described below. The regime parameters and test methods are summarized in Tables I, II, III and IV.

Foamed Polystyrene

Extrusion technology for the production of foamed polystyrene is discussed among other places in the Encyclopedia of Polymer Science and Engineering, John Wiley & Sons publishers 1998, Volume 16, pp 193-205.

The extruder is a twin screw extruder ex LMP Italy. Raw materials are added in granular form. A rotating barrel of 220 l is used for the mixing of FR-PS Master Batch, MB, and PS granules. The mixture is fed to the extruder main port with a dosing feeder. The extruder's barrel is heated with external heating bands and the temperature is kept uniform with thermostatic oil circulators. The FR-PS MB and polystyrene are melted in the first part of the extruder, when fully melted, the gas is fed to the extruder's barrel at about 1:3 of its length. From this point the melt is gradually cooled. The foaming mass exits from a flat die and continues to foam in an open mold made of two thermostatically controlled plates. The formed board is pulled and cooled in a series of rollers and finally trimmed and cut to desired length with a hot wire.

All foamed formulations were extruded under the same conditions. Processing conditions are summarized in Table I.

TABLE I

Processing conditions for Foamed PS articles

| Co-rotating twin-screw extruder | Units | Values |
|---|---|---|
| Feed Rate | Kg/Hour | 178 |
| ZONE 1 | ° C. | No heating |
| ZONE 2 | ° C. | 192 |
| ZONE 3 | ° C. | 212 |
| ZONE 4 | ° C. | 210 |
| ZONE 5 | ° C. | 89 |
| ZONE 6 | ° C. | 89 |

TABLE I-continued

Processing conditions for Foamed PS articles

| Co-rotating twin-screw extruder | Units | Values |
|---|---|---|
| ZONE 7 | ° C. | 150 |
| ZONE 8 | ° C. | 129 |
| Temperature of nozzle | ° C. | 130 |
| Screw Speed | RPM | 24 |
| Oil temperature | | |
| Extruders cooling zone | ° C. | 85 |
| Die | ° C. | 133 |
| In mold | | |
| Side zone | ° C. | 138 |
| Lips | ° C. | 127-138 |
| Table | ° C. | 88-91 |

Injection Molded Polystyrene

Injection molded specimens were also used to exemplify the efficiency of PBB-Br and other aromatic polyhalogenated halomethyl compounds of the general formula (I), as flame retardants in polystyrene. For this purpose injection molded or compression molded specimens were prepared and their flame retardancy measured by the methods detailed in Table II.

TABLE II

Standard flammability test methods for injection molded and foamed flame-retarded polystyrene

| PROPERTY | METHOD | APPARATUS |
|---|---|---|
| LOI Limiting Oxygen Index | ASTM D 2863-77. Measuring the minimum oxygen concentration to support candle-like combustion of plastics. | Stanton Redcroft FTA Flammability Unit. |
| Flammability | DIN 4101-1 B-2, Fire behavior of building materials and elements Part 1 classification of building materials requirements and testing. | Hood and burner as specified by DIN |
| Flammability | UL-94V | Hood and burner as specified by UL |
| Compressive stress at 10% deflection | ASTM D1621, Compressive properties of rigid cellular plastic, procedure A. | Zwick 1435 material testing machine. |

Compounding

All the components (plastic pellets and powders) were weighed on Sartorius semi-analytical scales with consequent manual mixing in a plastic bag. Formulations were compounded in Berstorff twin-screw extruder Type ZE-25, L/D=32:1 fed from one feeder. Compounding conditions are presented in Table III below. The obtained strands were cooled in a water bath and then pelletized in the Pelletizer 750/3 ex. Accrapak Systems Limited. The obtained pellets were dried in a circulating air oven at 70° C. for two hours.

Injection Molding

The compounded pellets were molded using Arburg-Allrounder machine model 320s/500-150. LOI and UL test specimens were molded, mold no. S 22963 was used. Molding conditions are presented in Table IV below.

TABLE III

Regime of compounding in co-rotating twin-screw extruder ex Berstorff

| Parameter | Units | Set Values |
|---|---|---|
| $T_1$ Feeding zone | ° C. | no heating |
| $T_2$ | ° C. | 140 |
| $T_3$ | ° C. | 150 |
| $T_4$ | ° C. | 170 |
| $T_5$ | ° C. | 170 |
| $T_6$ | ° C. | 180 |
| $T_7$ vent | ° C. | 180 |
| $T_8$ | ° C. | 180 |
| $T_9$ nozzle | ° C. | 190 |
| Screw speed | RPM | 375 |
| Feeding rate | kg/hour | 11.8 |

TABLE IV

Regime of injection-molding

| Parameter | Units | Set Values |
|---|---|---|
| $T_1$ (Feeding zone) | ° C. | 160 |
| $T_2$ | ° C. | 180 |
| $T_3$ | ° C. | 180 |
| $T_4$ | ° C. | 180 |
| $T_5$ (nozzle) | ° C. | 180 |
| Mold temperature | ° C. | 40 |
| Injection pressure | Bar | 1700 |
| Holding pressure | Bar | 700 |
| Back pressure | Bar | 0 |
| Injection time | Sec | 0.1 |
| Holding time | Sec | 1.5 |
| Cooling time | Sec | 10 |
| Mold closing force | kN | 128 |
| Filling volume (portion) | Cc | 30 |
| Injection speed | cc/sec | 20 |

Compression Molding

All the components (plastic pellets and powders) were weighed on Sartorius semi-analytical scales with consequent manual mixing. 70 g of the mixture were compounded in Brabender Plasticorder cell at 200° C. for 8 min and air cooled down to 160° C. Compounding speed was 40 RPM.

Test plates of 127×6.5×3.2 mm were prepared by pressing the compounded mixture in a press type Polystat ex. Schuabenthan at the following setting:

Press condition: Temperature 180° C., first pressure 1 min 0 bar, second pressure 1 min 100 bar.

The press plates were cooled with running water down to 100° C. and the samples were removed from the press. The plates were cut to LOI test specimens 6.5×127×3.2 mm. The test specimens were conditioned for 48 hour at room conditions before flammability testing.

Materials

Flame-retardants: PBB-Br and HBCD are products of Dead Sea Bromine Group, Israel. 1,2,3,4-Tetrabromo-5-bromomethyl-6-chloro-benzene (formula IV) prepared and characterized at Dead Sea Bromine Group, laboratory sample. Bromine content found 74.3% (calculated 76.67%); Chlorine content found 6.72% (calculated 6.8%); melting point 162.5° C.-166.0° C.

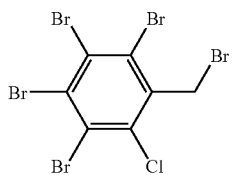

1,2,4-Tribromo-6-bromomethyl-3,5-dichloro-benzene (formula V) prepared and characterized at Dead Sea Bromine Group, laboratory sample. Bromine content found 63.42% (calculated 67.06%); Chlorine content found 13.5% (calculated 14.88%); melting point 143.0° C.-145.0° C.

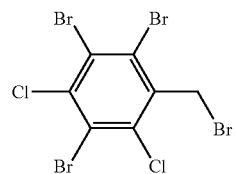

1,2,3,4,5-Pentabromo-6-chloromethyl-benzene (formula VI) prepared and characterized at Dead Sea Bromine Group, laboratory sample. Bromine content found 74.3% (calculated 76.67%); Chlorine content found 6.2% (calculated 6.80%); melting point 162.6° C.-163.3° C.

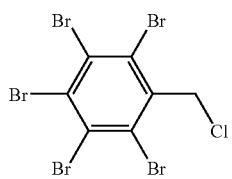

1,2,4-Tribromo-5-bromomethyl-benzene (formula VII) prepared and characterized at Dead Sea Bromine Group, laboratory sample. Bromine content found 80.5% (calculated 78.4%); melting point 93.7° C.-95.1° C.

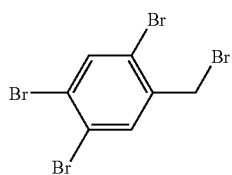

TPP (triphenyl phosphate), Reomol ex Ciba Geigy, was used as one commercial example for phosphate ester.

4,4'-biphenol phenylphosphate was used as one example of phosphate ester. The material is described in Patent Application EP 1 327 635.

The flow promoter used in the examples was commercial Interox C-C DFB Peroxide Chemie; 2,3-dimethyl-2,3-diphenyl butane, also referred to as dicumyl.

The aforesaid and other characteristics and advantages of the invention will be better understood through the description of the following illustrative and non-limitative examples.

EXAMPLES RP-1-4

Foamed FR-PS

Extruded foamed flame-retarded polystyrene RP-X specimens, the detailed composition of which is given in Tables VA-VB the processing conditions of which are detailed in Table I, were prepared according to the extrusion foaming procedure and equipment described above. Flammability testing methods were conducted according to LOI and DIN 4102 B2, for which reference is made in Table II—Test Methods. The flammability measurement of flame retarded polystyrene by LOI is a well known practice with which the skilled person will be familiar. Details of such tests are given, e.g., in U.S. Pat. No. 3,787,506.

The foamed samples of Table VB below were made using the master batches detailed in Table VA.

TABLE VA

| Composition of FR-PS-MB | | | |
|---|---|---|---|
| | MB-1 | MB-2 | MB-3 |
| Polystyrene 158K ex BASF, % | 57 | 57 | 70 |
| HBCD HM ex DSBG, % | 40 | | |
| PBB-Br ex DSBG, % | | 40 | 24.1 |
| Calcium Stearate % | 3 | 3 | 1.8 |
| CC DFB ex PEROXIDE CHEMIE, % | | | 4.1 |

Table VB herein below summarizes the extruded PS foamed specimens compositions.

TABLE VB

| Ingredients in the formulations for Foamed PS articles | | | | |
|---|---|---|---|---|
| | Formulation | | | |
| | RP-1 | RP-2 | RP-3 | RP-4 |
| % Br calculated | 2.0 | 2.0 | 1.0 | 1.0 |
| Type of MB | MB-1 | MB-2 | MB-2 | MB-3 |
| MB added, % | 6.6 | 5.88 | 2.94 | 4.94 |
| Polystyrene 158K ex BASF, % | 49.7 | 49.6 | 33.5 | 34.6 |
| Polystyrene type 637 ex DOW, % | 42.2 | 43.0 | 62.0 | 58.9 |
| Nucleating agent MB, % | 1.4 | 1.4 | 1.5 | 1.5 |
| Color, MB % | 0.1 | 0.1 | 0.1 | 0.1 |

A sample of foamed polystyrene with HBCD was produced for reference, RP-1. Samples RP-2-4 incorporated PBB-Br, all prepared via master batch in foamed polystyrene. Sample RP-4 used also flow promoter dicumyl in the formulation.

Comparative flammability tests measured either under LOI or DIN 4102 B2 standard methods as described in Table II, of flame-retarded foamed polystyrene are summarized in Table VI below. (In the Table Exp. No.=Formulation No.).

TABLE VI

Flammability and mechanical testing for Foamed FR-PS test pieces

| Exp No. | Br-FR type | % Br-FR | % Br in formulation calculated | % Dicumyl in formulation | Compressive stress at 10% deflection, N/cm$^2$ | LOI | Flammability according to DIN 4102 B2 |
|---|---|---|---|---|---|---|---|
| RP-1 | HBCD | 2.74 | 2.0 | — | 13.1 | 27.3 | Pass |
| RP-2 | PBB-Br | 2.4 | 2.0 | — | 14.6 | 24.3 | Pass |
| RP-3 | PBB-Br | 1.2 | 1.0 | — | 17.3 | 23.5 | Pass |
| RP-4 | PBB-Br | 1.2 | 1.0 | 0.2 | 17.9 | 25.0 | Pass |

EXAMPLES 5-16

Injection Molding

Polystyrene-Flame Retarded Formulations 5-16, the properties of which are detailed in Table VII, were compounded and injection molded substantially according to the compounding and injection molding procedures disclosed above. Their regimes are detailed in Tables III and IV, respectively.

Flammability testing of injection molded Formulations 5-16, described in Table VII, was conducted under standard LOI (Limiting Oxygen Index) testing, for which reference is made to Table II.

Table VII details the different formulations components used for injection-molded specimens 5-16. As can be seen, the formulations contain PBB-Br in different relative amounts with or without the addition of phosphorous flame-retardant synergist and dicumyl flow-promoter with one formulation containing HBCD for reference. Flammability results of these injection-molded flame-retarded polystyrene specimens, measured according to LOI standard procedure as described in Table II, are summarized in Table VII, which shows the equivalency of testing injection molded specimens and foamed specimens and which clearly demonstrates the advantage of employing synergists in the formulation. In all such formulations the LOI is higher than formulations that did not contain synergists. (In the Table, Exp. No.=Formulation No.).

TABLE VII

Flammability testing for Injection molded FR-PS test pieces

| Exp No. | Br-FR type | % Br-FR | % Br in formulation calculated | P-FR type | % P-FR | % P in formulation calculated | Interox CC DFB in formulation | LOI |
|---|---|---|---|---|---|---|---|---|
| 5 | HBCD | 2.74 | 2.0 | — | — | — | — | 23.5 |
| 6 | PBB-Br | 2.5 | 2.0 | — | — | — | — | 25.7 |
| 7 | PBB-Br | 1.8 | 1.5 | — | — | — | — | 25.3 |
| 8 | PBB-Br | 1.2 | 1.0 | — | — | — | — | 23.5 |
| 9 | PBB-Br | 1.8 | 1.5 | — | — | — | 0.2 | 26.7 |
| 10 | PBB-Br | 1.8 | 1.5 | — | — | — | 0.4 | 27.4 |
| 11 | PBB-Br | 1.8 | 1.5 | PFR-221 | 1.5 | 0.143 | — | 27.3 |
| 12 | PBB-Br | 1.8 | 1.5 | PFR-221 | 3.0 | 0.285 | — | 28.4 |
| 13 | PBB-Br | 1.8 | 1.5 | TPP | 1.5 | 0.143 | — | 25.5 |
| 14 | PBB-Br | 1.8 | 1.5 | TPP | 3.0 | 0.285 | — | 28.2 |
| 15 | PBB-Br | 1.8 | 1.5 | TPP | 0.8 | 0.076 | 0.1 | 29.3 |
| 16 | PBB-Br | 1.8 | 1.5 | TPP | 1.5 | 0.143 | 0.2 | 29.7 |

PFR-221 = 4,4'-Biphenol bis(diphenyl phosphate)
TPP = triphenyl phosphate

EXAMPLES 17-24

A number of injections molded PS formulations containing PBB-Br and other additives, numbered PF-17-24, and their respective LOI test results, carried out in accordance with the method described in Table II above, are shown in Table VIII herein below.

Table VIII clearly shows that maintaining a total bromine content of 1.5%, mostly derived from PBB-Br, in all flame-retarding mixtures corresponds to a good flame-retarding efficiency expressed in similar values of LOI. These results strongly suggest the high flame-retarding efficiency of PBB-Br mixed with other flame retardants or when not solely used.

TABLE VIII

Polystyrene formulations containing mixture of PBBBr (1.5% Br) + other additives – injection molded specimens

| | Formulation | | | | | | | |
|---|---|---|---|---|---|---|---|---|
| | PF-17 | PF-18 | PF-19 | PF-20 | PF-21 | PF-22 | PF-23 | PF-24 |
| PS Crystalline ex. DOW | 98.2 | 98.0 | 98.1 | 97.7 | 98.0 | 97.9 | 94.2 | 98 |
| PBBBr | 1.8 | 0.9 | 0.9 | 1.8 | 0.9 | 1.8 | 1.8 | 1.8 |
| FR-370[a] | | 1.1 | | | | | | |
| FR-513[b] | | | 1.0 | | | | | |
| FR-720[c] | | | | | 1.1 | | | |
| F-2200[d] | | | | | | 0.4 | | |
| NOR-116[f] | | | | 0.5 | | | | |
| Didodecyl 3,3'-thiodipropionate | | | | | | | 4 | |
| TAIC[e] | | | | | | | | 0.2 |
| Total % Br, calculated | 1.5 | 1.5 | 1.5 | 1.5 | 1.5 | 1.5 | 1.5 | 1.5 |
| LOI (% $O_2$) | 25.3 | 24.2 | 24.4 | 23.4 | 23.7 | 23.5 | 23.2 | 23.9 |

[a] FR-370 = Tris(tribromoneopentyl)phosphate, CAS Reg. Number 19186-97-1, ex DSBG.
[b] FR-513 = Tribromoneopentyl alcohol, CAS Reg. Number 36483-57-5, ex DSBG.
[c] FR-720 = Tetrabromobisphenol-A, bis(2,3-dibromopropylether), CAS Reg. Number 21850-44-2, ex DSBG.
[d] F-2200 = Brominated Epoxy Oligomer, CAS Reg. Number 68928-70-1, ex DSBG.
[e] TAIC = Tris-allyl iso cyanurate
[f] NOR-116 = ex. CIBA-GEIGY, CAS registry Number: 191680-81-6 100 (N,N''-1,2-ethanediylbis-reaction products with cyclohexane and peroxidized N-butyl-2,2,6,6-tetramethyl-4-piperidinamine-2,4,6-trichloro-1,3,5-triazine reaction products)

EXAMPLES 25-30

Compression Molding

Polystyrene compression molded specimen 25-30, the properties of which are detailed in Table IX, were compounded and molded substantially according to the procedures described above. Flammability testing of compression molded formulations 25-30 was conducted under standard LOI (Limiting Oxygen Index) testing, for which reference is made to Table II.

Table IX details the different formulations components used for compression-molded specimens 25-30. As can be seen, the formulations contain different polyhalogenated halomethyl compounds of the general formula (I) with one formulation containing HBCD for reference. Flammability results of these compression-molded flame-retarded polystyrene specimens, measured according to LOI standard procedure as described in Table II, are summarized in Table IX. Results clearly demonstrate that compression molded specimens can be used as well as foamed specimens or injection molded specimens and that the efficiency of different polyhalogenated halomethyl compounds of the general formula (I) is close or passes the required levels.

TABLE IX

Composition and Flammability of compression molded FR-PS test pieces

| Exp No./ Formulation No. | Br-FR type | % Br-FR | % Br in formulation calculated | LOI |
|---|---|---|---|---|
| 25 | HBCD | 2.74 | 2.0 | 23.5 |
| 26 | PBB-Br | 2.40 | 2.0 | 25.5 |
| 27 | 1,2,3,4-Tetrabromo-5-bromomethyl-6-chloro-benzene | 2.17 | 2.0 | 24.6 |
| 28 | 1,2,4-Tribromo-6-bromomethyl-3,5-dichloro-benzene | 2.46 | 2.0 | 23.7 |
| 29 | 1,2,3,4,5-Pentabromo-6-chloromethyl-benzene | 2.17 | 2.0 | 24.2 |
| 30 | 1,2,4-Tribromo-5-bromomethyl-benzene | 2.5 | 2.0 | 22.8 |

Table IX shows that the efficiency of different polyhalogenated halomethyl compounds of the general formula (I) as flame retardants for Polystyrene is good, all behaving in a similar way and are as efficient as HBCD.

EXAMPLES 31-35

Extrusion Molding—Production of FR-XPS

Equipment and Process

Extrusion equipment and procedures used for preparing Examples 31-35 have been the same as those detailed above.

Foaming Formulations

Five formulations were made without stop. Composition and preparation of the FR master batches used in the Examples are detailed in Table X.

TABLE X

Compositions (in weight %) of FR-PS-MB

|  | MB-31 | MB-32 | MB-33 | MB-34 | MB-35 |
|---|---|---|---|---|---|
| Polystyrene | 80 | 63.6 | 63.5 | 63.5 | 63.5 |
| HBCD HM ex DSBG |  | 18.6 |  |  |  |
| PBB-Br ex DSBG | 5.7 | 16.3 | 29.2 | 28.3 | 35 |
| TBX-DB* | 5.7 |  |  |  |  |
| F-2200 (brominated epoxy resin) ex DSBG |  |  |  | 5.8 |  |
| FR-370 (tris(tribromoneopentyl) phosphate) ex DSBG |  |  |  |  | 6.7 |
| CC DFB ex PEROXIDE CHEMIE | 1.3 |  |  |  |  |
| TPP** | 6.6 |  |  |  |  |
| Calcium Stearate | 0.7 | 1.5 | 1.5 | 1.5 | 1.5 |

*Tetrabromoxylenedibromide
**Triphenyl phosphate

Compositions comprising foam formulations containing different brominated flame-retardants and the corresponding FR master batches and percent bromine in the foams are reported in Table XI.

TABLE XI

Ingredients in the formulations for Foamed PS articles

|  |  | Formulation | | | | |
|---|---|---|---|---|---|---|
|  |  | 31 | 32 | 33 | 34 | 35 |
| % Br calculated | % | 1.5 | 1.5 | 1.5 | 1.5 | 2.0 |
| Polystyrene 158K ex BASF | % | 96.95 | 98.1 | 98.08 | 98.14 | 97.6 |
| Type of MB |  | MB-31 | MB-32 | MB-33 | MB-34 | MB-35 |
| HBCD HM ex DSBG | % |  | 1 |  |  |  |
| PBB-Br ex DSBG | % | 0.89 | 0.9 | 1.6 | 1.5 | 2.4 |
| TBX-DB | % | 0.91 |  |  |  |  |
| F-2200 ex DSBG | % |  |  | 0.32 |  |  |
| FR-370 ex DSBG | % |  |  |  |  | 0.36 |
| CC DFB ex PEROXIDE CHEMIE | % | 0.2 |  |  |  |  |
| TPP (triphenyl phosphate) | % | 1.05 |  |  |  |  |
| Additives* | % | 1.39 | 1.39 | 1.39 | 1.39 | 1.39 |

*Additives package includes: nucleating agents, foaming agents, stabilizers & color master batch.

All five formulations were extruded and foamed under the same conditions. Processing conditions are summarized in Table XII.

TABLE XII

Processing conditions during extruded foam production

Co-rotating twin-screw extruder

| Feed Rate | Kg | 178.0 |
|---|---|---|
| Screw Speed | Rpm | 24 |
| Calculated Feed Rate | Kg | 171.4 |
| ZONE 1 | °C. | 230 |
| ZONE 2 | °C. | 216 |
| ZONE 3 | °C. | 215 |
| ZONE 4 | °C. | 88 |
| ZONE 5 | °C. | 87 |
| ZONE 6 | °C. | 130 |
| ZONE 7 | °C. | 130 |
| ZONE 8 | °C. | 120 |
| Temperature of nozzle | °C. | 105 |
| Oil temperature |  |  |
| Extruders cooling zone | °C. | 80 |
| Nozzle | °C. | 80 |
| In mold |  |  |
| Side zone | °C. | 124 |
| Lips | °C. | 125 |
| Table | °C. | 118 |

Mechanical and flammability properties of the extruded polystyrene foam (XPS) boards were evaluated and the properties are summarized in Table XIII. For flammability testing, the boards were cut to 150×10×10 mm specimens for LOI testing according to ASTM D2863 and to 190×90×26 mm specimens for B-2. As can be seen, all Examples passed successfully the flammability tests.

From Table XIII, one can see that polystyrene foams containing PBB-Br in combination with additives such as free radical initiators, phosphate esters, and other brominated flame retardants give superior flammability resistance and good mechanical properties.

TABLE XIII

Flammability and mechanical testing for foamed FR-PS test pieces

| Exp. No. | Density, kg/m³ | Compressive stress at 10% deflection, N/cm² Aging time at room conditions 27 days | LOI % O₂ After 88 hr/50% humidity | Flammability according to DIN 4102 B2 (Edge ignition) |
|---|---|---|---|---|
| 31 | 29.4 | 24 | 26.6 | Pass |
| 32 | 32.6 | 23.5 | 25.1 | Pass |
| 33 | 30.3 | 22.4 | 22.5 | Pass |
| 34 | 30.2 | 22.7 | 22.9 | Pass |
| 35 | 33.4 | 30.3 | 24.1 | Pass |

While examples of the invention have been described for purposes of illustration, it will be apparent that many modifications, variations and adaptations can be carried out by persons skilled in the art, without exceeding the scope of the claims.

The invention claimed is:

1. A styrenic polymer composition comprising a flame-retardant effective amount of a compound of formula (I), $(C_6H_{(5-n)}Y_n)CH_2X$:

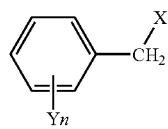

X = Cl, Br
Y = Cl, Br
n = 1-5 wherein:
X is Cl or Br;
Y is Cl or Br; and
n is an integer from 1 to 5;
or a mixture of two or more of said compounds of formula (I).

2. A polymer composition according to claim 1, wherein at least one of the formula (I) compounds is pentabromobenzyl bromide.

3. A polymer composition according to claim 1, wherein said styrenic polymer is a foamed polystyrene.

4. A polymer composition according to claim 1, wherein said styrenic polymer is an injection molding grade, clear polystyrene.

5. The composition according to claim 1, wherein the formula (I) compounds are selected from the group consisting of 1,2,3,4-tetrabromo-5-bromomethyl-6-chloro-benzene, 1,2,4-tribromo-6-bromomethyl-3,5-dichloro-benzene, 1,2,3,4,5-pentabromo-6-chloromethyl-benzene, and 1,2,4-tribromo-5-bromomethyl-benzene.

6. The composition of claim 1, wherein said composition further comprises synergists, a flow-promoter, or a combination thereof, said synergists being selected from a phosphate or phosphorous compound.

7. The composition of claim 6 wherein said phosphorous compound is present in an amount of from 0.1% to 10.0% by weight based on 100% of styrene polymer.

8. The composition of claim 7 wherein said phosphorous compound is present in an amount of from 0.5% to 2.0% by weight based on 100% of styrene polymer.

9. The composition of claim 6, wherein said phosphorous compound is 4,4'-biphenol bis(diphenyl phosphate).

10. The composition of claim 6, wherein said phosphorous compound is TPP (triphenyl phosphate).

11. The composition of claim 6 wherein said flow promoter is selected from the group consisting of dimethyldiphenylbutane; dicumyl peroxide; alpha,alpha'-bis-tert-butylperoxydi-isopropylbenzene; 2,3-dimethyl-2,3-diphenylbutane; bis(alpha-phenylethyl) sulfone; 1,1'-diphenylbicyclohexyl; 2,2'-dimethyl-2,2'-azobutane; 2,2'-dibromo-2,2'-azobutane; 2,2'-dichloro-2,2'-azobutane; 2,2'-dimethyl-2,2'-azobutane-3,3'4,4'-tetracarboxylic acid; 1,1'-diphenylbicyclo-pentyl; 2,5-bis (tribromomethyl)-1,3,4-thiadiazole; dioctyl tin maleate, and dibutyl tin maleate.

12. The composition of claim 11 wherein said flow promoter is present in an amount of from 0.01% to 0.2% by weight based on 100% of styrene polymer.

13. The composition of claim 12 wherein said flow promoter is present in an amount of from 0.02% to 0.1% by weight based on 100% of styrene polymer.

14. The composition of claim 11, wherein said flow-promoter is dicumyl (2,3-dimethyl-2,3-diphenylbutane).

15. The composition of claim 1, further comprising other flame-retardant additives.

16. The composition of claim 15, wherein said additives are selected from the group consisting of tris(tribromoneopentyl)phosphate, tribromoneopentyl alcohol, tetrabromobisphenol-A, bis(2,3-dibromopropylether), brominated epoxy oligomer, tris-allyl iso cyanurate, didodecyl 3,3'-thiodipropionate, 1,3-propanediamine, N,N"-1,2-ethanediylbis-reaction products with cyclohexane and peroxidized N-butyl-2,2,6,6-tetramethyl-4-piperidinamine-2,4,6-trichloro-1,3,5-triazine reaction products, and mixtures thereof.

17. A master batch for the preparation of a styrenic polymer composition, said composition comprising a flame-retardant effective amount of a compound of formula (I):

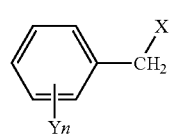

X = Cl, Br
Y = Cl, Br
n = 1-5 wherein:
X is Cl or Br;
Y is Cl or Br; and
n is an integer from 1 to 5;
or a mixture of two or more of said compounds of formula (I).

18. The master batch of claim 17, wherein said compound of formula (I) is pentabromobenzyl bromide.

19. The master batch of claim 17, wherein said polymer is polystyrene.

20. The master batch of claim 17, wherein said formula (I) compounds are selected from the group consisting of 1,2,3,4-tetrabromo-5-bromomethyl-6-chloro-benzene, 1,2,4-tribromo-6-bromomethyl-3,5-dichloro-benzene, 1,2,3,4,5-pentabromo-6-chloromethyl-benzene, 1,2,4-tribromo-5-bromomethyl-benzene, and their homologues and derivatives.

21. A master batch according to claim 17, further comprising other flame-retardant additives.

22. The master batch of claim 21, wherein said additives are selected from the group consisting of tris(tribromoneopentyl)phosphate, tribromoneopentyl alcohol, tetrabromobisphenol-A, bis(2,3-dibromopropylether), brominated epoxy oligomer, tris-allyl iso cyanurate, didodecyl 3,3'-thiodipropionate, 1,3-propanediamine, N,N"-1,2-ethanediylbis-reaction products with cyclohexane and peroxidized N-butyl-2,2,6,6-tetramethyl-4-piperidinamine-2,4,6-trichloro-1,3,5-triazine reaction products and mixtures thereof.

23. A foamed styrenic polymer comprising a flame-retardant effective amount of a compound of formula (I);

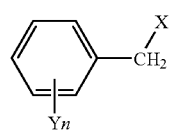

X = Cl, Br
Y = Cl, Br
n = 1-5 wherein:
X is Cl or Br;
Y is Cl or Br; and
n is an integer from 1 to 5;
or a mixture of two or more of said compounds of formula (I).

24. The foamed styrenic polymer of claim 23, wherein at least one of the formula (I) compounds is pentabromobenzyl bromide.

25. The foamed styrenic polymer of claim 23, wherein the formula (I) compounds are selected from the group consisting of 1,2,3,4-tetrabromo-5-bromomethyl-6-chloro-benzene, 1,2,4-tribromo-6-bromometh-yl-3,5-dichloro-benzene, 1,2,3,4,5-pentabromo-6-chloromethyl-benzene; and 1,2,4-tribromo-5-bromomethyl-benzene.

26. The foamed styrenic polymer of claim 23, further comprising other flame-retardant additives.

27. The foamed styrenic polymer of claim 26, wherein said additives are selected from the group consisting of tris(tribromoneopentyl)phosphate, tribromoneopentyl alcohol, tetrabromobisphenol-A, bis(2,3-dibromopropylether), brominated epoxy oligomer, tris-allyl iso cyanurate, didodecyl 3,3'-thiodipropionate, 1,3-propanediamine, N,N"-1,2-ethanediylbis-reaction products with cyclohexane and peroxidized N-butyl-2,2,6,6-tetramethyl-4-piperidinamine-2,4,6-trichloro-1,3,5-triazine reaction products, and mixtures thereof.

28. The foamed styrenic polymer of claim 23, prepared from a master batch comprising a flame-retardant effective amount of a compound of formula (I):

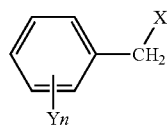

(I)

X = Cl, Br
Y = Cl, Br
$n$ = 1-5 wherein:
X is Cl or Br:
Y is Cl or Br: and
n is an integer from 1 to 5;
or a mixture of two or more of said compounds of formula (I).

29. The foamed styrenic polymer of claim 23, which has been made by extrusion.

30. The foamed styrenic polymer of claim 23, wherein the styrenic polymer further comprises synergists, a flow-promoter, or a combination thereof, said synergists being selected from a phosphate or phosphorous compound.

31. The foamed styrenic polymer of claim 30, wherein said phosphorous compound is present in an amount of from 0.1% to 10.0% by weight based on 100% of styrene polymer.

32. The foamed styrenic polymer of claim 30, wherein said phosphorous compound is present in an amount of from 0.5% to 2.0% by weight based on 100% of styrene polymer.

33. The foamed styrenic polymer of claim 30, wherein said phosphorous compound is 4,4'-biphenol bis(diphenyl phosphate).

34. The foamed styrenic polymer of claim 30, wherein said phosphorous compound is TPP (triphenyl phosphate).

35. The foamed styrenic polymer of claim 30, wherein said flow-promoter is selected from the group consisting of dimethyldiphenylbutane; dicumyl peroxide; alpha,alpha'-bis-tert-butylperoxydiisopropylbenzene; 2,3-dimethyl-2,3-diphenylbutane; bis(alpha-phenylethyl) sulfone; 1,1'-diphenylbicyclo-hexyl; 2,2'-dimethyl-2,2'-azobutane; 2,2'-dibromo-2,2'-azobutane; 2,2'-dichloro-2,2'-azobutane; 2,2'-dimethyl-2,2'-azobutane-3,3'4,4'-tetracarboxylic acid; 1,1'-diphenylbicyclopentyl; 2,5-bis (tribromomethyl)-1,3,4-thiadiazole; dioctyl tin maleate, and dibutyl tin maleate.

36. The foamed styrenic polymer of claim 30, wherein a flow promoter is present in an amount of from 0.01% to 0.2% by weight based on 100% of styrene polymer.

37. The foamed styrenic polymer of claim 36, wherein the flow promoter is present in an amount of from 0.02% to 0.1% by weight based on 100% of styrene polymer.

38. The foamed styrenic polymer of claim 30, wherein the flow-promoter is dicumyl (2,3-dimethyl-2,3-diphenylbutane).

39. A method of rendering foamed polystyrene flame-retarded comprising adding to said foamed polystyrene an effective amount of PBB-Br.

40. The method of claim 39, further comprising adding synergists, a flow-promoter, or a combination thereof, said synergist being selected from a phosphate or phosphorous compound, said flow-promoter being selected from the group consisting of dimethyldiphenylbutane; dicumyl peroxide; alpha,alpha'-bis-tert-butylperoxydiisopropylbenzene; 2,3-dimethyl-2,3-diphenylbutane; bis(alpha-phenylethyl) sulfone; 1,1'-diphenylbicyclo-hexyl; 2,2'-dimethyl-2,2'-azobutane; 2,2'-dibromo-2,2'-azobutane; 2,2'-dichloro-2,2'-azobutane; 2,2'-dimethyl-2,2'-azobutane-3,3'4,4'-tetracarboxylic acid; 1,1'-diphenylbicyclopentyl; 2,5-bis (tribromomethyl)-1,3,4-thiadiazole; dioctyl tin maleate, and dibutyl tin maleate.

41. The method of claim 40, wherein the phosphorous compound is 4,4'-biphenol bis(diphenyl phosphate).

42. The method of claim 40, wherein the phosphorous compound is TPP (triphenyl phosphate).

43. The method of claim 40, wherein the flow-promoter is dicumyl (2,3-dimethyl-2,3-diphenylbutane).

* * * * *